United States Patent Office 3,043,429
Patented July 10, 1962

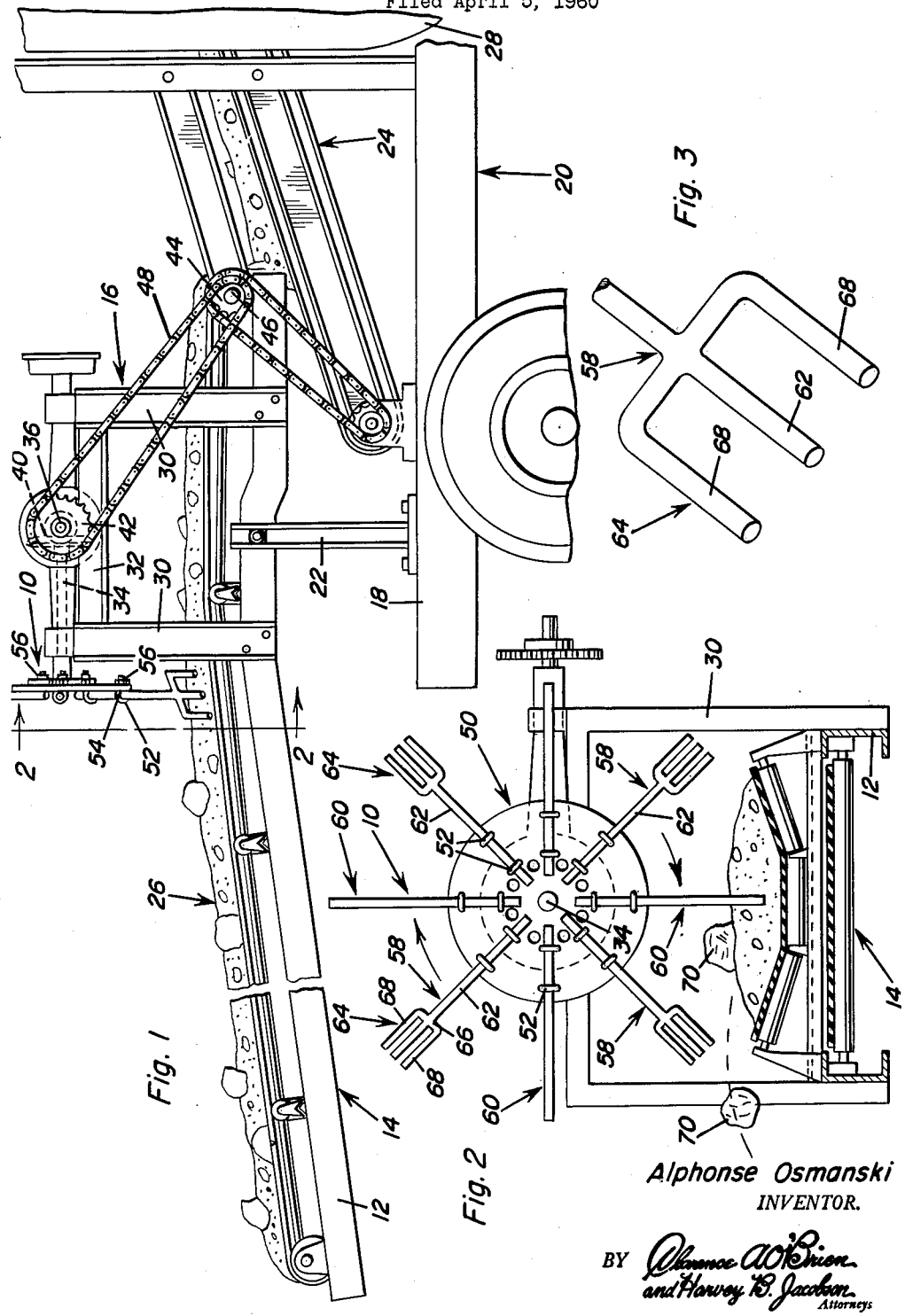

---

3,043,429
ROCK SORTER
Alphonse Osmanski, Rte. 4, Box 512, Pueblo, Colo.
Filed Apr. 5, 1960, Ser. No. 20,211
3 Claims. (Cl. 209—247)

This invention relates to a novel and useful rock sorter, and more particularly to a rock sorter which is adapted to be positioned about a conveyor belt or the like conveying a heterogeneous mixture of solid particles including larger undesirable particles. The rock sorter is adapted to engage and laterally deflect the movement of the larger particles of the heterogeneous mixture whereby these larger particles of the mixture will be deflected laterally off one longitudinal side edge of the conveyor.

In many instances, dirt and the like being loaded upon trucks for transportation to a point of use is composed of a heterogeneous mixture of smaller and larger particles, which larger particles are not desirable. In the past, the heterogeneous mixture of dirt being conveyed by means of a conveyor belt to trucks and the like for transportation to a point of use have been relieved of the larger unwanted particles of dirt and rocks by means of a laborer positioned along the conveyor whose job it was to manually pick the rocks and larger particles of dirt from the mixture being conveyed by the conveyor. The use of manual labor for this purpose is not only dangerous to the laborer himself but is less efficient than machinery which does not tire and which may be adjusted to remove larger particles exceeding a predetermined size.

It is therefore the main object of this invention to provide a rock sorter specifically adapted for sorting and removing the larger particles of a heterogeneous mixture of dirt and the like being conveyed by a conveyor belt.

A further object of this invention, in accordance with the immediately preceding object, is to provide a rock sorter which may be conveniently adapted to be driven by means of the power source utilized to drive the conveyor whereby the rock sorter speed may be governed by the speed of the conveyor belt.

Yet another object of this invention is to provide a rock sorter which will remove the larger particles of a heterogeneous mixture without also removing appreciable amounts of the smaller particles of the mixture.

A final object to be specifically enumerated herein is to provide a rock sorter which will conform to conventional forms of manufacture, be of simple construction, and effective in achieving its purpose so as to provide a device that will be economically and highly desirable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the rock sorter shown mounted to the frame of a conveyor belt conveying a heterogeneous mixture of dirt for the purposes of removing the larger particles of the mixture, the rock sorter being shown operatively connected to the power source for driving the conveyor;

FIGURE 2 is a transverse vertical sectional view taken substantially upon the plane indicated by the section line 2—2 of FIGURE 1; and FIGURE 3 is an enlarged perspective view of one of the arms of the rock sorter.

Referring now more specifically to the drawings, the numeral 10 generally designates a rock sorter comprising the present invention which is shown in FIGURE 1 secured to the main frame 12 of a conveyor generally referred to by the reference numeral 14 by means of a mounting assembly generally referred to by the reference numeral 16. The conveyor 14 is of the mobile type and is mounted on the chassis or frame 18 of a vehicle generally referred to by the reference numeral 20 by means of support standards 22.

The vehicle 20 includes a second conveyor generally referred to by the reference numeral 24 onto which the heterogeneous mixture of dirt generally referred to by the reference numeral 26 carried by the conveyor 14 is placed prior to the movement of the mixture 26 into a suitable carrier 28 by means of the conveyor 24.

The mounting assembly 16 includes two pairs of generally U-shaped support standards 30 which are spaced longitudinally of the frame 12 and are interconnected at their upper ends by means of a pair of brace members 32. The inverted U-shaped standards 30 are positioned over and embrace the conveyor 14. A shaft 34 is journaled for rotation about an axis above and in substantial alignment with the longitudinal axis of the conveyor 14. The shaft 34 is operatively connected to a transverse shaft 36 by means of a gearing assembly 40 and the end of the transverse shaft 36 remote from the gearing assembly 40 is provided with a sprocket wheel 42 which is in alignment with a sprocket wheel 44 which is secured to the driving shaft 46 of the conveyor 14. It is to be understood that any convenient motor means (not shown) may be operatively connected to the driving shaft 46 to effect its rotation. An endless tensioning member 48 is entrained about the sprocket wheels 42 and 44.

The end of the shaft 34 remote from the gearing assembly 40 has a mounting disk generally referred to by the reference numeral 50 secured thereto. The shaft 34 projects through the center of the mounting disk 50 and the disk 50 is secured to the shaft 34 for rotation therewith. The mounting disk 50 is provided with radially spaced pairs of apertures (not shown) and a generally U-shaped clamping element 52 has the free end portions of its legs secured through each pair of apertures. The free ends of the legs 54 of the U-shaped clamping elements 52 are threaded and have threaded fasteners 56 threadedly engaged therewith, see FIGURE 1. Each pair of U-shaped clamping elements 52 extends radially of the disk 50 and the arms 58 and 60 of the sorter 10 are each secured to the disk 50 by a pair of clamping elements 52. It is to be noted that the clamping elements 52 are releasable and therefore it is to be understood that the arms 58 and 60 of the rock sorter 10 may be adjusted radially of the disk 50. Each of the arms 60 includes a substantially straight rod-like member which may be of any desired cross-sectional shape. Although in some instances, a circular cross-section has proven to be most desirable, arms 60 octagonal in cross-section have been found most desirable in other instances.

Each of the arms 58 includes rod-like shank 62 substantially similar to the arm 60 and the shank 62 of the arm 58 is provided with a generally U-shaped member generally referred to by the reference numeral 64 adjacent its outer end. The bight portion 66 of each of the U-shaped members 64 extends substantially transversely of the shank 62 a spaced distance from the free end thereof. The legs 68 of each of the U-shaped members 64 project outwardly away from the disk 50 from the opposite ends of the bight portion 66 and are substantially parallel to the adjacent portion of the shank 62. Further, it is to be noted that the plane containing the legs 68 of each of the U-shaped members 64 also contains the adjacent portion of the corresponding shank 62.

Further, it is to be noted that the plane containing the legs 68 of each of the U-shaped members 64 is disposed at an angle relative to the plane containing the disk 50.

It is to be noted that although the arms 58 and 60 are each individually adjustable radially of the disk 50, it is in most cases desirable to have the outer ends of each of the arms 58 and 60 positioned an equal distance from the shaft 34.

With particular attention directed to FIGURE 2 of the drawings it will be noted that the arms 58 and 60 swing, upon rotation of the disk 50, through an arc with the outer ends thereof passing through the heterogeneous mixture 26 of dirt carried by the conveyor 14. The arms 60 are adapted to engage, turn and at least momentarily interrupt the movement of the larger mixture particles 70 so that the next arm 58 to pass through the mixture 26 will be able to engage and laterally deflect the movement of the larger particles 70 whereby they will be deflected laterally off one longitudinal side edge of the conveyor 14. In this manner, the mixture 26 being conveyed by the conveyor 14 may have the larger particles 70 removed therefrom in an effective and rapid manner thereby rendering the use of a manual laborer to hand-pick the larger particles 70 from the mixture 26 unnecessary. Inasmuch as the rock sorter 10 is adapted to be powered by the power source for the conveyor 14, the cost of operating the rock sorter 10 is negligible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. For use in connection with a conveyor belt for conveying a heterogeneous mixture of solid particles including larger undesirable particles; a sorter, said sorter including a shaft adapted to be journaled for rotation about an axis generally paralleling, in vertical alignment with and spaced above said conveyor belt, a plurality of arms, means securing said arms to said shaft for rotation therewith and with said arms extending generally radially of the shaft, longitudinal adjustment radially of said shaft and rotational adjustment about the longitudinal axis of said arms, the outer ends of said arms adapted to pass closely to the upper surface of said conveyor belt and through the heterogeneous mixture being carried thereby, some of said arms being adapted to engage and at least momentarily stop the larger particles of said mixture and other of said arms being adapted to engage and laterally deflect the movement of the larger particles last engaged by the preceding one of said arms whereby the larger particles of said mixture will be deflected laterally off one longitudinal side edge of said conveyor, said securing means including a mounting disk, said shaft extending centrally through said disk, said disk being secured to said shaft for rotation therewith, clamping elements secured to said disk and disposed along radii of said disk in pairs of spaced clamping elements, each pair of said clamping elements clampingly engaging the end of one of said arms adjacent said shaft at points spaced longitudinally therealong, said clamping elements being releasable, each of said arms being adjustable radially of said disk, said some arms each comprising a substantially straight rod-like member, said other arms each also comprising substantially straight rod-like members, the free ends of said other arms each being provided with a substantially U-shaped member with the bight portions thereof extending substantially transversely of the corresponding other arms a spaced distance from the ends thereof, the free ends of said other arms lying in a plane containing the legs of the corresponding U-shaped members.

2. The combination of claim 1 wherein the ends of each of said legs and the corresponding arms are aligned.

3. The combination of claim 2 wherein said some arms and said other arms are positioned alternately about said disk.

References Cited in the file of this patent

UNITED STATES PATENTS

| | | |
|---|---|---|
| 567,475 | Hindermeier | Sept. 8, 1896 |
| 1,803,148 | Sheppard | Apr. 28, 1931 |
| 2,024,513 | Diescher | Dec. 17, 1935 |
| 2,277,450 | Parr | Mar. 24, 1942 |
| 2,464,305 | Greaves | Mar. 15, 1949 |
| 2,758,728 | Henry | Apr. 14, 1956 |

FOREIGN PATENTS

| | | |
|---|---|---|
| 774,461 | Great Britain | May 8, 1957 |
| 906,030 | Germany | Mar. 8, 1954 |